United States Patent
Poteau et al.

[11] Patent Number: 5,232,479
[45] Date of Patent: Aug. 3, 1993

[54] ADSORBER COMPRISING ANNULAR SUPERPOSED BEDS OF ADSORBENT MATERIALS

[75] Inventors: Michel Poteau, Dammartin en Goele; Sylvie Eteve, Fontenay aux Roses, both of France

[73] Assignee: L'Air Liquide, Societe Anonyme pour l'Etude et l'Exploitation des Procedes Georges Claude, Paris, France

[21] Appl. No.: 923,212

[22] Filed: Jul. 30, 1992

[30] Foreign Application Priority Data

Jul. 31, 1991 [FR] France ............................ 91 09718

[51] Int. Cl.[5] ............................................. B01D 53/04
[52] U.S. Cl. .................................. 55/387; 55/389; 55/475
[58] Field of Search ............... 55/816, 350, 387, 389, 55/390, 475, 179–181

[56] References Cited

U.S. PATENT DOCUMENTS

| | | | |
|---|---|---|---|
| 2,062,548 | 12/1936 | Wilson | 55/387 X |
| 2,404,468 | 7/1946 | Vokes et al. | 55/387 |
| 2,428,329 | 9/1947 | Ham et al. | 55/387 X |
| 2,686,572 | 8/1954 | Cameron et al. | 55/387 |
| 3,847,574 | 11/1974 | Fish | 55/387 |
| 4,129,426 | 12/1978 | Furasen | 55/387 X |
| 4,133,659 | 1/1979 | Beckman | 55/387 X |
| 4,133,660 | 1/1979 | Steiner | 55/387 |
| 4,266,952 | 5/1981 | Turek | 55/387 X |
| 4,541,851 | 9/1985 | Bosquain et al. | 55/387 X |
| 4,544,384 | 10/1985 | Metschl et al. | 55/390 X |
| 4,698,072 | 10/1987 | Rohde et al. | 55/389 X |

FOREIGN PATENT DOCUMENTS

| | | |
|---|---|---|
| 0118349 | 9/1984 | European Pat. Off. . |
| 0202516 | 11/1986 | European Pat. Off. . |
| 0402783 | 12/1990 | European Pat. Off. . |
| 0261744 | 11/1988 | Fed. Rep. of Germany ........ 55/387 |
| 3926597 | 2/1991 | Fed. Rep. of Germany . |
| 1607903 | 11/1990 | U.S.S.R. ................... 55/387 |
| 397128 | 8/1933 | United Kingdom . |

*Primary Examiner*—Robert Spitzer
*Attorney, Agent, or Firm*—Curtis, Morris & Safford

[57] ABSTRACT

The adsorber of the type comprising annular superposed beds, contains in its upper zone, a device to maintain and compress the upper bed, a flexible impervious membrane which separates the lower bed from the upper bed in its intermediate zone, and a cylindrical wall defining an internal annular duct for the lower bed in its lower zone. Application for example to the production of oxygen.

14 Claims, 4 Drawing Sheets

ADSORBER COMPRISING ANNULAR SUPERPOSED BEDS OF ADSORBENT MATERIALS

BACKGROUND OF INVENTION (a) Field of the Invention

The present invention concerns adsorbers for the production or purification of a gas from a gaseous mixture, which may be used in the so called PSA (Pressure Swing Adsorption) or TSA (Temperature Swing Adsorption) processes by utilising the preferential adsorption properties of certain adsorbent materials, and more particularly concerns an adsorber of the type comprising, superposed in a vertical tubular vertical sheath including, at its lower part, a gaseous mixture inlet and a gas outlet, a lower annular bed of adsorbent material and an upper annular bed of adsorbent material each radially separating an internal duct from an external duct, respectively, the external ducts of the two beds freely communicating with one another.

(b) Description of Prior Art

An adsorber of this type is described in the document U.S. Pat. No. 4,544,384. In this document, the lower bed and the upper bed are partially separated by means of a metallic separation structure of biconical shape which increases the vertical dimension of the adsorber and does not permit to prevent a preferential passage of gas from bed to bed without radially and successively passing through the two beds. On the other hand, the arrangement described in this document does not provide means which limit the free circulation of gas between the upper ends of the external and internal ducts on both sides of the upper bed.

SUMMARY OF INVENTION

It is an object of the present invention to propose an adsorber of compact design, low manufacturing and installation costs, which optimize the gas passages through beds of adsorbent material and limit the dead volumes of gas and, consequently, the losses of charge during operation, and therefore enable a substantially improved productivity.

For this purpose, according to a characteristic of the invention, the sheath includes, at its upper end, a central orifice for loading beds of adsorbent material and the adsorber includes means which limit the free circulation of gas between the upper ends of the external and internal ducts on both sides of the upper bed.

According to more specific aspects of the invention, these means for limiting the passages of gas consist of a flexible wall which is applied under pressure on the upper end of the upper bed, by means of a bed of heavy particles and/or a gas under pressure.

According to another characteristic of the invention, the adsorber comprises an impervious flexible annular wall which is disposed between the lower and upper beds, so as to permit a rapid filling of the adsorber while preventing all risks of preferential passage of gas directly from bed to bed.

According to another characteristic of the invention, the gas mixture inlet is in communication with the internal duct of the lower bed, this internal duct being annular and interiorly defined by a cylindrical wall which is mounted in the sheath, so as to limit the dead volumes of gas from the feed side.

BRIEF DESCRIPTION OF DRAWINGS

Other characteristics and advantages of the present invention will appear from the description which follows of embodiments given by way of illustation but without limitation, with reference to the annexed drawings, in which.

In the description which follows and in the drawings, identical or analogous elements are represented by the same reference numerals, possibly indexed.

DESCRIPTION OF PREFERRED EMBODIMENTS

Figure 1:
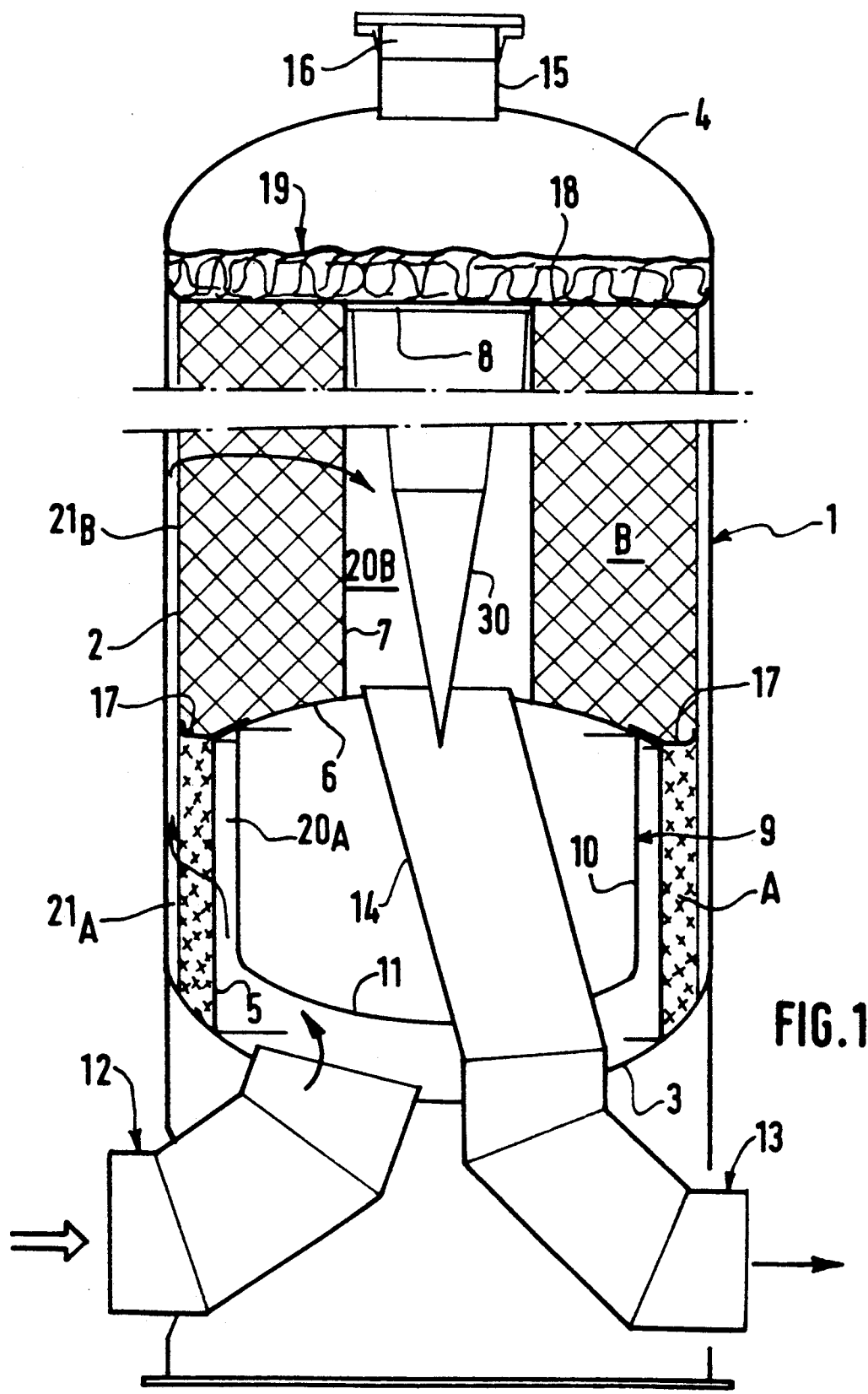
FIG. 1 is a schematic view in vertical cross-section of a first embodiment of adsorber according to the invention.

FIG. 1 illustrates an adsorber, which is for example more particularly suitable for the production of oxygen from air in a PSA or VSA process. The adsorber comprises a vertical tubular sheath 1 in which there is concentrically disposed, a tubular perforated wall 2, typically consisting of a concentric arrangement of two tubular grids having through passages or orifices of different dimensions, extending nearly along the entire height of sheath 1, at a short radial distance from the later whose ends are closed, in this embodiment, by means of a lower cupola 3 and an upper cupola 4. In the lower part of sheath 1 there is a perforated tubular wall 5 which extends upwardly from the lower cupola 3 and whose upper end is closed by means of an interior transverse partition in the form of cupola 6 and which thus defined, with the lower end of the perforated wall 2, a lower annular space. On the transverse partition 6, a tubular interior perforated wall 7 which is closed at its upper end by means of a transverse partition 8 which is substantially coplanar with the upper end of the exterior tubular perforated partition 2 and thus defines with the latter an upper annular space, is mounted vertically. The interior volume defined by the lower perforated tubular wall 5 houses a hollow cap 9 comprising a lateral tubular wall 10, whose upper end is fixed to the transverse partition 6, and a rounded bottom 11 extending near the lower cupola 3. In the space defined between the latter and the bottom 11, a feed duct for a gaseous mixture 12 opens, while the interior space defined by the upper interior tubular perforated wall 7 communicates with a gas discharge duct 13 which opens at the base of the adsorber opposite the feed duct 12, via an interior duct 14 which passes through the cap 9 and cupola 3. The upper cupola 4 includes a central loading orifice 15 which may be closed by plug 16.

For the operation of the adsorber, first there is introduced through loading orifice 15, a first adsorbent material, such as particles of alumina, for the production of oxygen, until the lower annular space between the lower part of the exterior perforated wall 2 and the adjacent perforated wall 5 is filled, so as thus to constitute a lower annular bed of adsorbent material A. On the upper end of the bed of adsorbent material A there is then disposed a flexible and impervious wall 17, which rests interiorly on the transverse partition 6 and consists of an annular cloth or a plurality of radial sheets which are partially superposed, for example, of an elastomeric material such as that which is commercialized under the designation "HYPALON", for the production of oxygen. Particles of a second adsorbent material are thereafter poured through the loading orifice 15, for example, zeolites, in the case of the production of oxygen, until the upper annular space between the exterior perforated wall 2 and the upper interior perforated wall 7, is filled, so as to thus constitute an upper annular bed of adsorbent material B whose radial height and thickness are clearly larger than those of the corresponding lower bed A. Loading of the upper bed B ensures, via flexible wall 17, a tight compression of the lower bed A.

In the illustrated embodiment, there is then disposed on the annular upper end of the upper bed B and on the central end partition 8 a flexible wall 18 whose transverse dimensions slightly exceed those of sheath 1.

In the embodiment of FIG. 1, to maintain the upper part of bed B and to directly recapture the compression of the adsorbent material of this bed B, a pressure is applied on the upper face of the flexible wall 18 so that the latter exerts a downward pressure on the adsorbent material B. In this embodiment, the pressure is exerted through a layer of sand 19, or any other heavy material having a high load loss, which is poured by the loading orifice 15. In this case, the flexible wall 18 may consists of a non elastic metallic grid with fine meshes.

The operation of the adsorber which has just been described will easily be understood. The gaseous mixture containing the gas to be produced is introduced through duct 12, is substantially uniformly distributed in the internal annual space 20A between the lower bed A and the cap 9, is forced to pass radially through the lower bad A in the external annular space 21A between the lower bed A and the sheath 1, thence, upwardly, directly into the external annular space 21B around the upper bed B, then through the latter in the upper internal duct 20B to escape, via duct 14, by means of evacuation duct 13. It will be understood that with an arrangement according to the invention, all risks of a direct passage of gas between the lower A and upper B bed and between the upper ends of the ducts 21B and 20B are removed.

Figure 2:
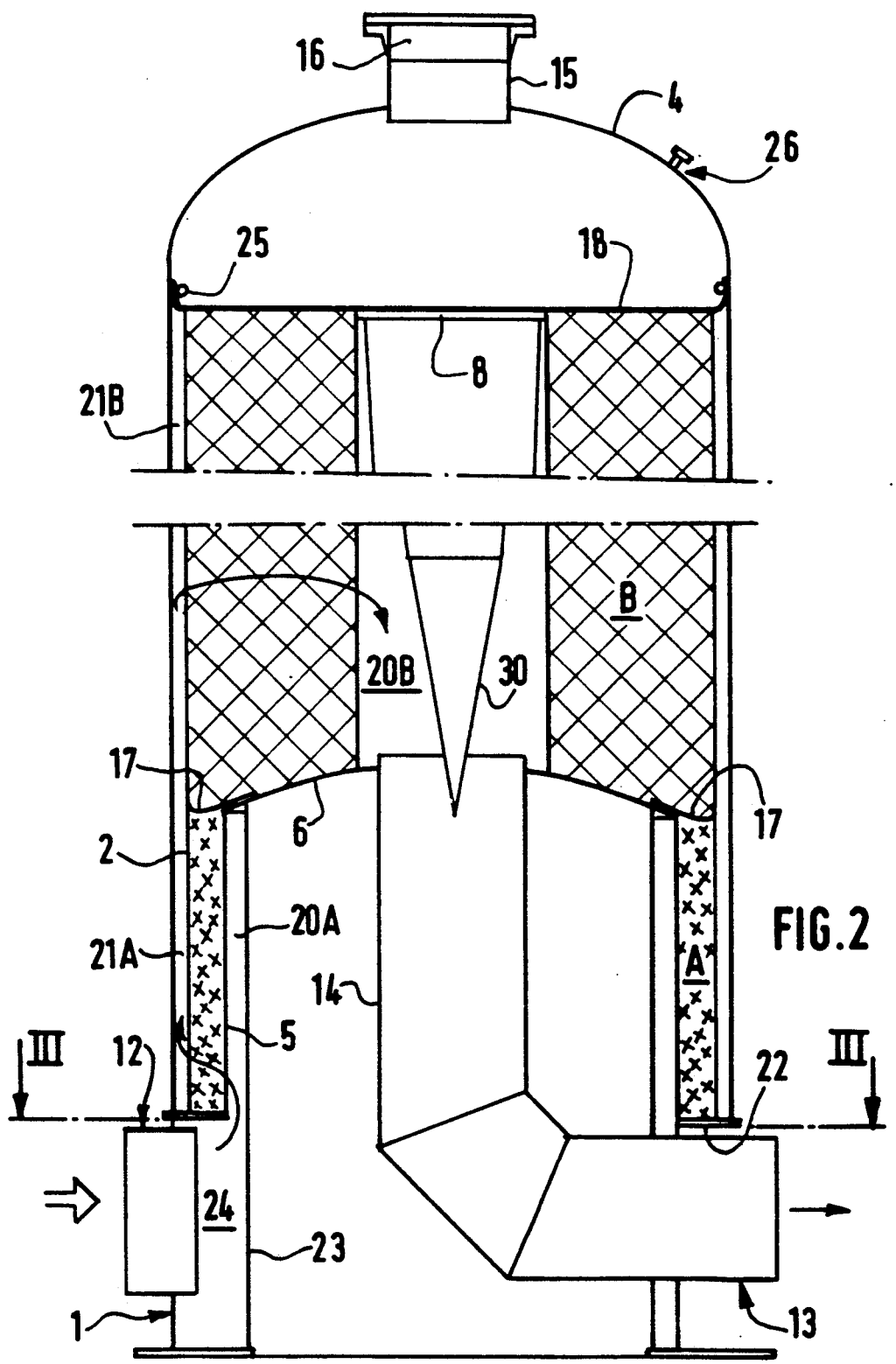
FIG. 2 is a view similar to FIG. 1 of another embodiment of the invention.
Figure 3:
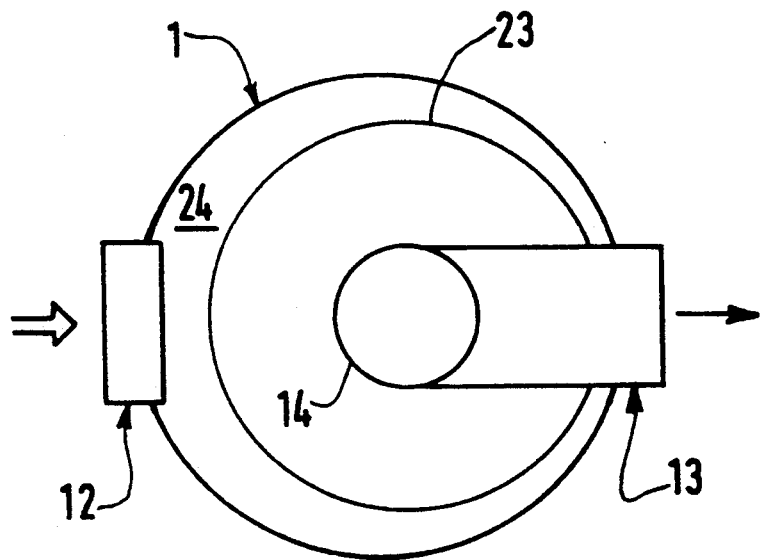
FIG. 3 is a transverse cross-section view along line III—III of FIG. 2.

The embodiment illustrated in FIG. 2 differs from that represented in FIG. 1 by the following points: the sheath 1 has no lower closing cupola 3 but extends to the base of the adsorber and the means for applying confinement pressure on the flexible wall 1B are here of the pneumatic type. In this embodiment, the lower bed A and its external duct 21A are bound at the lower portion by an annular transverse partition 22. The internal inlet duct 20A of the lower bed A is here interiorly bound by a sleeve 23 extending from the transverse partition 6 to the base of the apparatus. As it will be better seen in FIG. 3, the lower part of the sheath 1 has a reduced diameter and is eccentric with respect to the main axis of the apparatus in a direction towards the feeding duct 12 so as to define an annular chamber 24 for feeding the internal duct 20A having a cross-section which progressively decreases from the inlet 12 to the diametrically opposite and for an optimized distribution of the gaseous mixture towards the internal inlet face of the lower bad A. At the upper part of the adsorber, the flexible wall 18, consisting here of an impervious membrane, for example also of the elastomeric material "HYPALON", is pinched by its peripheric edge which is raised against the internal face of sheath 1 by means of a crimping ring 25 and is laid against the upper end of the upper bed B by introducing a gas pressure in the upper cap 4 through a gas inlet 26, which pressure is for example in the system including the apparatus. The flexible wall 18 may also be formed by an inflatable balloon with occupies the entire upper portion of the apparatus and is pressurized by means of a gas under pressure. The pressurizing gas may originate from a so called "air instrument" circuit of the system and supplies a given pressure by means of an expander. The gas may also be taken from the mixture (for example air) which feeds the adsorber. Advantageously, the membrane 18 will be passed simultaneously by means of a gas under pressure and through a layer of sand, as described with respect to the embodiment of FIG. 1.

Figure 4:
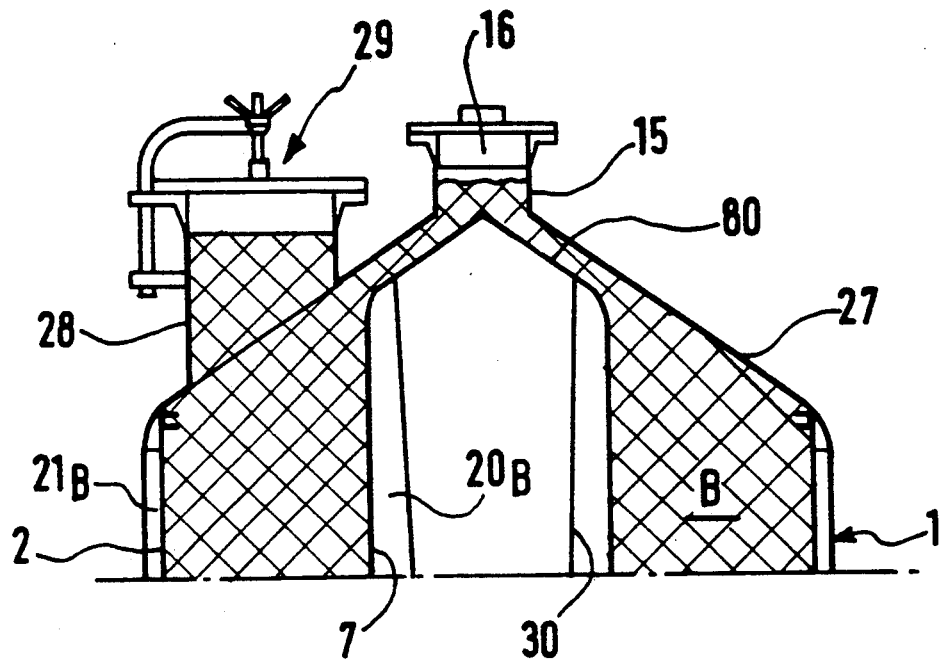
FIG. 4 is a partial view in vertical cross-section of the upper end of an adsorber according to another embodiment of the invention.

In the embodiment of FIG. 4, upper cupola 4 is replaced by an end of a truncated sheath 27 whose angle with the horizontal corresponds substantially to the sloping angle which is observed when filling a drum with the particles of the adsorbent material B; typically, for granules of zeolite, the angle is between 35° and 45°. In this embodiment, the external perforated cylindrical wall 2 extends upwardly to be in contact with the conical end 27, and the upper internal perforated cylindrical wall 7 extends upwardly to the neighborhood of the central zone of the truncated end 27 and is closed by means of a truncated end wall 80 substantially of the same angle as the truncated end 27. Thus, by loading to the maximum the upper annular space constituting the upper bed B of the absorbent material, the absorbent material will fill the space above the end wall 80 thus eliminating all risks of direct passage in upper direction between the external duct 21B and the internal duct 20B. To ensure an adequate filling and compacting, advantageously, there will be provided in the upper truncated end 27, a lateral shaft 28 which is filled with adsorbent material B and is associated with mechanical means 29 which exerts a pressure on the adsorbent material contained in the shaft 28.

Figure 5:
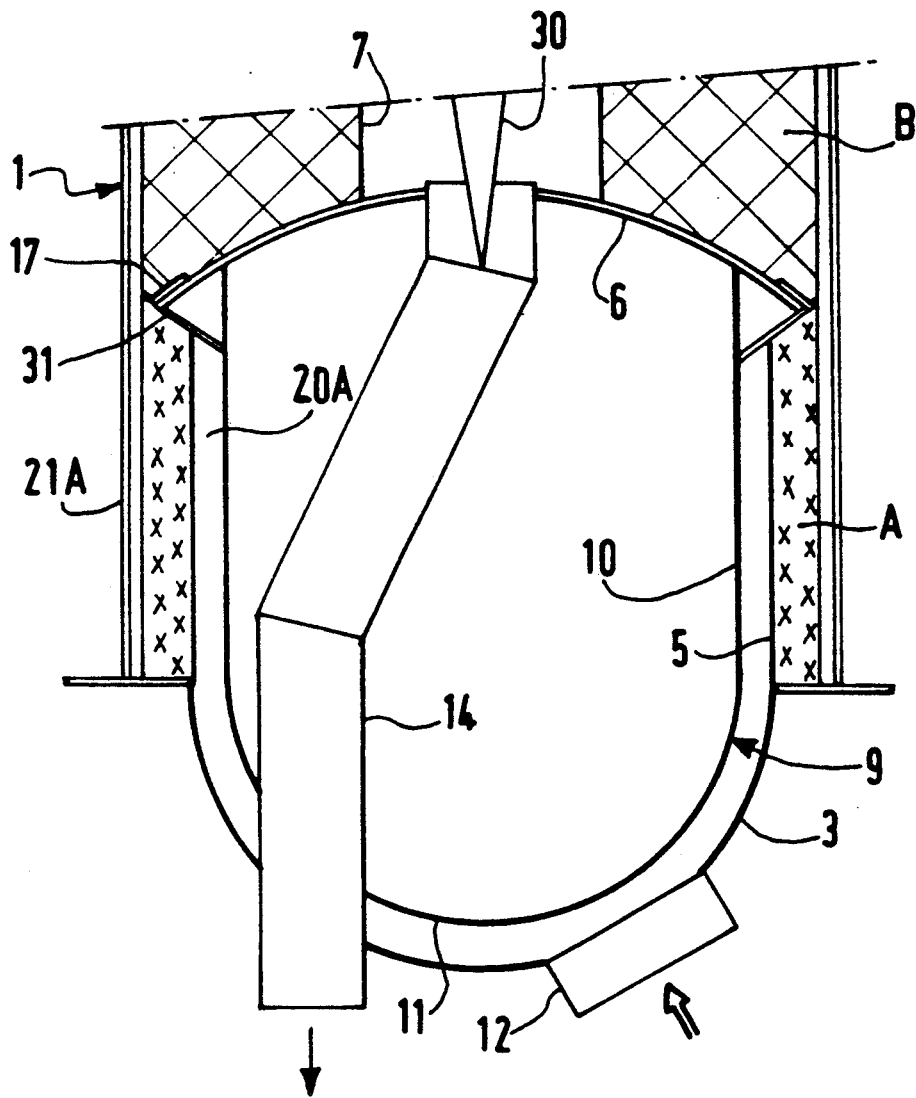
FIG. 5 is a partial view, in vertical cross-section, of the lower end of another embodiment of adsorber according to the invention.

The embodiment of FIG. 5 is analogous to that described with reference to FIG. 1. To optimize the circulation and the distribution of the gaseous feeding mixture, the hollow cap 9 extends downwardly past the lower part of bed A, and has a substantially hemispherical bottom 11. The lower cupola 3 is also substantially hemispherical and extends near bottom 11. The transverse partition 5 extends radially towards the exterior and is connected to an annular partition 31 which closes the upper end of the internal annular space 20A by forming a "nozzle" which partially closes the duct between beds A and B and establishes a zone of rest and guiding for the separation membrane 17.

According to a more specific characteristic of the invention, as illustrated in the drawings, to optimize the flow into the upper internal duct 20B, the latter advantageously includes in its center a nucleus with evolutive profile which decreases towards the lower part 30 and ends in the internal duct 14, and defines an internal passage whose cross-section increases substantially linearly towards the bottom.

Although the present invention has been described with respect to specific embodiments, it is not limited thereto but, on the contrary, is capable of modifications and variants which will appear to one skilled in the art.

We claim:

1. Adsorber for the production or purification of a gas, comprising a vertical tubular sheath including, at a lower part thereof, an inlet for a gaseous mixture and a gas outlet, a lower annular bed of adsorbent material, an upper annular bed of adsorbent material superposed on the lower annular bed, each bed radially separating a respective external space from an internal space, the external spaces freely communicating with one another, the internal space of the lower bed being in communication with the gaseous mixture inlet and the internal space of the upper bed being in communication with the gas outlet, the sheath further including, at its upper end, a central orifice for loading the beds of absorbent material and also including means for limiting free circulation of gas between the upper ends of the external space and the internal space on both sides of the upper bed.

2. Adsorber according to claim 1, wherein the limiting means consist of an upper conical end of the sheath defining an angle between 35° and 45° with respect to the horizontal, the upper end of the upper bed terminating at said upper conical end of the sheath.

3. Adsorber according to claim 1, wherein the limiting means comprise a flexible wall on the upper end of the upper bed adapted to receive a pressure applied thereto.

4. Adsorber according to claim 3, wherein pressure on the flexible wall is exerted by means of a gas under pressure.

5. Adsorber according to claim 3, wherein pressure is exerted on the flexible wall by means of a bed of heavy particles.

6. Adsorber according to claim 1, further including an impervious flexible annular wall disposed between the lower and upper beds to separate said beds.

7. Adsorber according to claim 6 wherein the lower bed contains particles of alumina and the upper bed contains particles of an adsorbent material suitable for the production of oxygen gas.

8. Adsorber according to claim 1, wherein the internal space of the lower bed is annular and interiorly defined by a cylindrical wall disposed in the sheath.

9. Adsorber according to claim 8, wherein the cylindrical wall is eccentric with respect to the axis of the adsorber in a direction opposite the inlet of the gas mixture.

10. Adsorber according to claim 8, wherein the gas outlet is provided at the base of the sheath and communicates with the internal space of the upper bed whose upper end is closed.

11. Adsorber according to claim 10, wherein the internal space of the upper bed has a cross-section which increases substantially linearly towards the bottom of the sheath.

12. Adsorber according to claim 8 wherein the lower bed contains particles of alumina and the upper bed contains particles of an adsorbent material suitable for the production of oxygen gas.

13. Adsorber according to claim 1, wherein the lower bed has a radial thickness which is smaller than that of the upper bed.

14. Adsorber according to claim 1 wherein the lower bed contains particles of alumina and the upper bed contains particles of an adsorbent material suitable for the production of oxygen gas.

* * * * *